(12) United States Patent
Hung

(10) Patent No.: US 11,313,682 B1
(45) Date of Patent: Apr. 26, 2022

(54) SILICON PHOTONIC INTEGRATED CIRCUIT AND FIBER OPTIC GYROSCOPE APPARATUS USING GRATING COUPLERS

(71) Applicant: NATIONAL SUN YAT-SEN UNIVERSITY, Kaohsiung (TW)

(72) Inventor: Yung-Jr Hung, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 19 days.

(21) Appl. No.: 17/125,949

(22) Filed: Dec. 17, 2020

(30) Foreign Application Priority Data

Nov. 13, 2020 (TW) .................................. 109139810

(51) Int. Cl.
*G01C 19/72* (2006.01)
*G02B 6/27* (2006.01)
*G02B 6/293* (2006.01)

(52) U.S. Cl.
CPC ............. *G01C 19/725* (2013.01); *G02B 6/27* (2013.01); *G02B 6/29304* (2013.01)

(58) Field of Classification Search
CPC ...... G01C 19/725; G02B 6/27; G02B 6/29304
See application file for complete search history.

(56) References Cited

U.S. PATENT DOCUMENTS

| | | | |
|---|---|---|---|
| 5,026,161 A | 6/1991 | Werner | |
| 5,142,660 A * | 8/1992 | Chang | G02B 6/12007 385/10 |
| 5,854,678 A | 12/1998 | Liu et al. | |
| 6,169,832 B1 | 1/2001 | McLandrich | |
| 7,894,073 B2 | 2/2011 | Qiu et al. | |
| 10,041,797 B2 | 8/2018 | Jain | |
| 10,274,319 B2 | 4/2019 | Wang | |
| 10,731,988 B1 | 8/2020 | Paniccia et al. | |

(Continued)

FOREIGN PATENT DOCUMENTS

| | | |
|---|---|---|
| CN | 102297691 A | 12/2011 |
| CN | 110579204 A | 12/2019 |

(Continued)

OTHER PUBLICATIONS

Yin-Hsuan Lee, Low-back-reflection grating coupler on silicon-on-insulator for on-chip gyroscope application, May 2020, CLEO: Science and Innovations (Year: 2020).*

(Continued)

*Primary Examiner* — Michael P LaPage
(74) *Attorney, Agent, or Firm* — CKC & Partners Co., LLC

(57) ABSTRACT

A silicon photonic integrated circuit is provided, which includes a first optical power splitter, a second optical power splitter, a first grating coupler and a second grating coupler. The first optical power splitter has an input, a first output and a second output, in which the input is configured to receive an inputted beam, and the first output is configured to output a returned beam. The second optical power splitter has an input, a first output and a second output, in which the input is coupled to the second output of the first optical power splitter. The first and second grating couplers are respectively coupled to the first and second outputs of the second optical power splitter, and are configured to optically couple two opposite ends of a fiber coil, respectively.

20 Claims, 11 Drawing Sheets

(56) References Cited

U.S. PATENT DOCUMENTS

| | | | | |
|---|---|---|---|---|
| 2006/0171633 | A1* | 8/2006 | Voigt | G01C 19/721 385/37 |
| 2007/0263224 | A1* | 11/2007 | Keyser | G01C 19/72 356/461 |
| 2014/0204387 | A1* | 7/2014 | Narayanan | H01S 3/10023 356/461 |
| 2016/0069686 | A1* | 3/2016 | Lee | G01C 19/661 356/460 |
| 2016/0231120 | A1 | 8/2016 | Guattari et al. | |
| 2018/0259337 | A1 | 9/2018 | Wang | |
| 2021/0325169 | A1* | 10/2021 | Sobolewski | G01C 19/727 |

FOREIGN PATENT DOCUMENTS

| | | |
|---|---|---|
| CN | 109579816 B | 6/2020 |
| EP | 2096408 A2 | 9/2009 |
| JP | 2008020435 A | 1/2008 |
| TW | 254436 | 8/1995 |
| TW | I493157 B | 7/2015 |

OTHER PUBLICATIONS

Beibei Wu, Mode-assisted Silicon Integrated Interferometric Optical Gyroscope, Sep. 10, 2019, Scientific Reports (Year: 2019).*

Minh A. Tran et al., "Integrated optical driver for interferometric optical gyroscopes," Optics Express, Feb. 20, 2017, pp. 3826-3840, vol. 25, No. 4.

Tin Komljenovic et al., "Frequency modulated lasers for interferometric optical gyroscopes," Optics Letters, Apr. 15, 2016, pp. 1773-1776, vol. 41, No. 8.

Taran Huffman et al., "Ultra-Low Loss Large Area Waveguide Coils for Integrated Optical Gyroscopes," IEEE Photonics Technology Letters, Jan. 15, 2017, pp. 185-188, vol. 29, No. 2.

Sarat Gundavarapu et al., "Interferometric Optical Gyroscope Based on an Integrated Si3N4 Low-Loss Waveguide Coil," Journal of Lightwave Technology, Feb. 15, 2018, pp. 1185-1191, vol. 36, No. 4.

KVH Indudtries, Inc., "Advantages of photonic chip technology in inertial systems: Disruptive Technology for Safe, Precise Autonomous Navigation," 2nd Edition eBook, 2020.

* cited by examiner

SILICON PHOTONIC INTEGRATED CIRCUIT AND FIBER OPTIC GYROSCOPE APPARATUS USING GRATING COUPLERS

RELATED APPLICATIONS

This application claims priority to Taiwan Application Serial Number 109139810, filed on Nov. 13, 2020, which is herein incorporated by reference.

BACKGROUND

Field of the Invention

The invention relates to a fiber optic gyroscope (FOG), and more particularly to a silicon photonic integrated circuit with grating couplers for optically connecting fiber coil(s) and an FOG apparatus having such silicon photonic integrated circuit.

Description of Related Art

At present, gyroscope technologies are mainly categorized into interferometric fiber optic gyroscopes (IFOGs), resonator fiber optic gyroscopes (RFOGs) and ring laser gyroscopes (RLGs). For the operation of the IFOG, a signal light with a broad wavelength range is generated by the light source and enters the main optical path through the optical power splitter, and then another optical power splitter is used to guide the signal light to the optical fiber coil in clockwise and counterclockwise directions, and afterwards the two signal lights transmitted in the opposite direction leave the fiber coil and return to the optical power splitter for the following signal detection. Currently the optoelectronic components used in IFOGs are mostly discrete modules that are individually packaged, and fiber leads are used to connect the two ends of a single-mode fiber coil to form a Sagnac loop. Such IFOG system configuration suffers from higher assembly cost, higher power consumption, and larger size. Moreover, the connections between the discrete modules by the fiber leads cause phenomenon such as an additional parasitic interface light reflection, a higher optical insertion loss, and the shift of polarization direction with high environmental sensitivity.

SUMMARY

The purpose of the invention is to provide a silicon photonic integrated circuit and a fiber optic gyroscope (FOG) apparatus with grating couplers so that the light with a specific polarization direction and a specific wavelength range can be introduced into or out of the chip. In comparison with in-plane edge coupling, the use of grating couplers as optical input and output allows a better polarization extinction ratio and a higher fiber alignment tolerance. Grating coupler also serves as an optical band-pass filter to stabilize the mean wavelength of light source. The silicon photonic integrated circuit monolithically integrates multiple optoelectronic components in an IFOG system instead of using fiber leads for optical connections among modules. This arrangement reduces the optical insertion loss and parasitic interface light reflection of the overall system. It also helps stabilize the polarization direction of light propagating on the chip, so as to reduce the signal distortion caused by polarization deviation. The overall system chip is highly integrated, which greatly reduces the chip area and the production cost, and has a lower system power consumption.

According to the aforementioned purpose, the invention provides a silicon photonic integrated circuit, which includes a first power splitter, a second power splitter, a first grating coupler and a second grating coupler. The first power splitter has an input port, a first output port and a second output port, of which the input port is configured to receive an input light beam, and the first output port is configured to output a return light beam. The second power splitter has an input port, a first output port and a second output port, of which the input port is coupled to the second output port of the first power splitter. The first and second grating couplers are respectively coupled to the first and second output ports of the second power splitter, and are configured to optically couple two opposite ends of a fiber coil.

In accordance with one embodiment of the invention, the silicon photonic integrated circuit further includes a phase modulator that has a first input port, a second input port, a first output port and a second output port, of which the first and second input ports are respectively coupled to the first and second output ports of the second power splitter, and the first and second output ports are respectively coupled to the first and second grating couplers.

In accordance with another one embodiment of the invention, the silicon photonic integrated circuit further includes a third grating coupler. The third grating coupler is coupled to the input port of the first power splitter, and is configured to optically couple a light source that provides the input light beam.

In accordance with another one embodiment of the invention, the first to the third grating couplers are arranged at the same pitch and are aligned with respect to each other in an arrangement direction.

In accordance with another one embodiment of the invention, the silicon photonic integrated circuit further includes fourth and fifth grating couplers and a connecting wire, in which the two ends of the connecting wire are respectively coupled to the fourth and fifth grating couplers.

In accordance with another one embodiment of the invention, the first to fifth grating couplers are arranged at the same pitch and are aligned with respect to each other in an arrangement direction, and wherein the first to third grating couplers are arranged between the fourth and fifth grating couplers.

In accordance with another one embodiment of the invention, the silicon photonic integrated circuit further includes an optical band-pass filter that allows the input light beam within specific wavelength range to be coupled to the input port of the first power splitter.

In accordance with another one embodiment of the invention, the silicon photonic integrated circuit further includes a fourth grating coupler. The fourth grating coupler is coupled to the first output port of the first power splitter, and is configured to optically couple a photodetector.

In accordance with another one embodiment of the invention, the silicon photonic integrated circuit further includes a polarization filter. The polarization filter is coupled to the second output port of the first power splitter and the input port of the second power splitter, or is coupled to the input port of the first power splitter, or is coupled to the first output port of the first power splitter.

In accordance with another one embodiment of the invention, the silicon photonic integrated circuit further includes a photodetector. The photodetector is coupled to the first output port of the first power splitter, and is configured to receive the return light beam.

According to the aforementioned purpose, the invention further provides a silicon photonic integrated circuit, which includes a first power splitter, a second power splitter, a first wavelength division multiplexer/demultiplexer, a second wavelength division multiplexer/demultiplexer and first to sixth grating couplers. The first power splitter has an input port, a first output port and a second output port, of which the input port is configured to receive an input light beam, and the first output port is configured to output a return light beam. The second power splitter has an input port, a first output port and a second output port, of which the input port is coupled to the second output port of the first power splitter. The first wavelength division multiplexer/demultiplexer has an input port and three output ports, of which the input port is coupled to the first output port of the second power splitter. The second wavelength division multiplexer/demultiplexer has an input port and three output ports, of which the input port is coupled to the second output port of the second power splitter. The first to sixth grating couplers are respectively coupled to the first to third output ports of the first wavelength division multiplexer/demultiplexer and the first to third output ports of the second wavelength division multiplexer/demultiplexer. The first and fourth grating couplers are configured to optically couple two opposite ends of a first fiber coil, respectively. The second and fifth grating couplers are configured to optically couple two opposite ends of a second fiber coil, respectively. The third and sixth grating couplers are configured to optically couple two opposite ends of a third fiber coil, respectively.

In accordance with one embodiment of the invention, the silicon photonic integrated circuit further includes a phase modulator that has a first input port, a second input port, a first output port and a second output port. The first and second input ports of the phase modulator are respectively coupled to the first and second output ports of the second power splitter, and the first and second output ports of the phase modulator are respectively coupled to the input port of the first wavelength division multiplexer/demultiplexer and the input port of the second wavelength division multiplexer/demultiplexer.

In accordance with another one embodiment of the invention, the silicon photonic integrated circuit further includes a seventh grating coupler. The seventh grating coupler is coupled to the input port of the first power splitter, and is configured to optically couple a light source that provides the input light beam.

In accordance with another one embodiment of the invention, the first to seventh grating couplers are arranged at the same pitch and are aligned with respect to each other in an arrangement direction.

According to the aforementioned purpose, the invention further provides an FOG apparatus, which includes a light source, a first power splitter, a first photodetector, a second power splitter, a first grating coupler, a second grating coupler and a first fiber coil. The first power splitter has an input port, a first output port and a second output port, of which the input port is optically coupled to the light source. The first photodetector is optically coupled to the first output port of the first power splitter. The second power splitter has an input port, a first output port and a second output port, of which the input port is coupled to the second output port of the first power splitter. The first and second grating couplers are respectively coupled to the first and second output ports of the second power splitter. The two opposite ends of the first fiber coil are optically coupled to the first and second grating couplers, respectively.

In accordance with one embodiment of the invention, the FOG apparatus further includes a third grating coupler. The third grating coupler is coupled to the input port of the first power splitter, and is configured to couple the input light beam provided by the light source to the input port of the first power splitter.

In accordance with another one embodiment of the invention, the first to third grating couplers are arranged at the same pitch and are aligned with respect to each other in an arrangement direction.

In accordance with another one embodiment of the invention, the FOG apparatus further includes a first wavelength division multiplexer/demultiplexer, a second wavelength division multiplexer/demultiplexer, third to sixth grating couplers, a second fiber coil and a third fiber coil. The first wavelength division multiplexer/demultiplexer has an input port and first to third output ports, of which the input port and the first output port are respectively coupled to the first output port of the second power splitter and the first grating coupler. The second wavelength division multiplexer/demultiplexer has an input port and first to third output ports, of which the input port and the first output port are respectively coupled to the second output port of the second power splitter and the second grating coupler. The third to sixth grating couplers are respectively coupled to the second output port of the first wavelength division multiplexer/demultiplexer, the second output port of the second wavelength division multiplexer/demultiplexer, the third output port of the first wavelength division multiplexer/demultiplexer and the third output port of the second wavelength division multiplexer/demultiplexer. The two opposite ends of the second fiber coil are optically coupled to the third and fourth grating couplers, respectively. The two opposite ends of the third fiber coil are optically coupled to the fifth and sixth grating couplers, respectively.

In accordance with another one embodiment of the invention, the silicon photonic integrated circuit further includes a phase modulator that has a first input port, a second input port, a first output port and a second output port, of which the first and second input ports are respectively coupled to the first and second output ports of the second power splitter, and the first and second output ports are respectively coupled to the input port of the first wavelength division multiplexer/demultiplexer and the input port of the second wavelength division multiplexer/demultiplexer.

In accordance with another one embodiment of the invention, the FOG apparatus further includes a third wavelength division multiplexer/demultiplexer and a photodetector array structure. The third wavelength division multiplexer/demultiplexer has an input port and first to third output ports, in which the input port is coupled to the first output port of the first power splitter. The photodetector array structure has a first photodetector, a second photodetector and a third photodetector in addition to the first photodetector. The first to third photodetectors are optically coupled to the first to third output ports of the third wavelength division multiplexer/demultiplexer, respectively.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

Figure 1A:
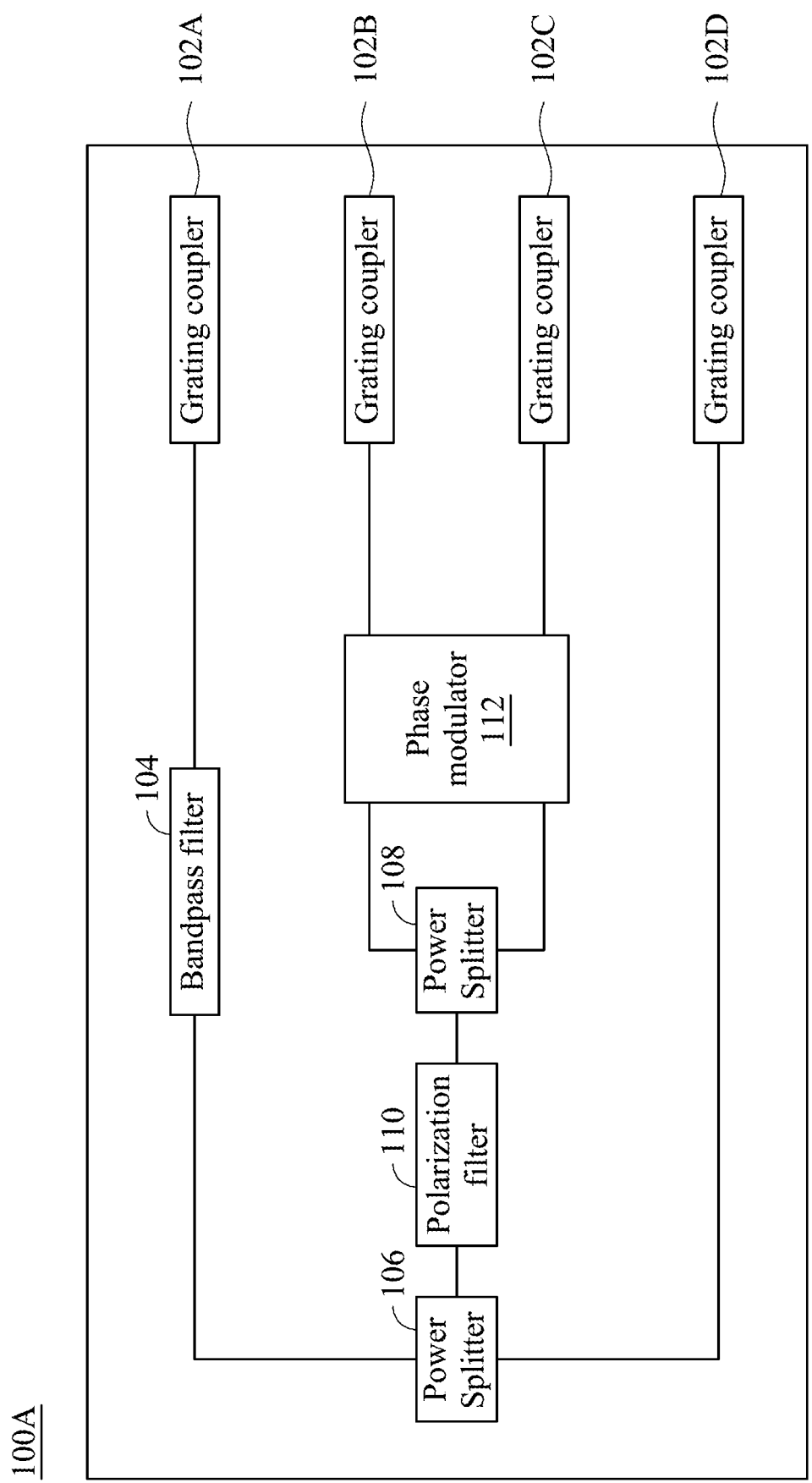
FIGS. 1A-1C are respective schematic diagrams of silicon photonic integrated circuits in accordance with various embodiments of the invention.

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form.

It will be understood that, although the terms "first," "second," "third" and so on may be used herein to describe various signals and/or entities, these signals and/or entities should not be limited by these terms. These terms are only used to distinguish a signal and/or entity from another signal and/or entity.

The document may repeat reference numerals and/or letters in the various examples. This repetition is for the purpose of simplicity and clarity and does not in itself dictate a relationship between the various embodiments and/or configurations discussed.

FIG. 1A is a schematic diagram of a silicon photonic integrated circuit 100A in accordance with some embodiments of the invention. As shown in FIG. 1A, the silicon photonic integrated circuit 100A includes grating couplers 102A-102D, a bandpass filter 104, power splitters 106 and 108, a polarization filter 110 and a phase modulator 112. Each of the grating couplers 102A-102D has high coupling efficiency for light with a particular polarization direction and a particular wavelength range, and thus is comparable to an optical coupler in combination with a polarization filter and a bandpass filter. For example, the grating couplers may be designed to have a polarization state of transverse electric wave and a polarization extinction ratio of greater than 20 dB as well as a bandpass wavelength linewidth of about 40 nm. The grating coupler 102A is configured to optically couple a light source, such as a superluminescent diode (SLD), an erbium-doped fiber amplifier (EDFA), a III-V compound Fabry-Perot laser light source, or another suitable light source. The grating couplers 102B and 102C are configured to optically couple two opposite ends of a fiber coil, respectively. The grating coupler 102D is configured to optically couple a photodetector, such as a photodiode, a PIN photodiode, an avalanche photodiode (APD), or another suitable photodetector. The coupled photodetector may be a germanium photodetector, a silicon-germanium photodetector, a III-V compound semiconductor photodetector (e.g. InGaAs photodetector), or another suitable photodetector depending on material characteristics. The light source may be an SLD or an EDFA with a wide wavelength band for reducing non-linear phenomenon of light in the waveguide, such as two-photon absorption phenomenon as well as for reducing the impact of interface optical reflection and Rayleigh back-scattering to the FOG performance. The input and output ports of the bandpass filter 104 are respectively coupled to the grating coupler 102A and the input port of the power splitter 106 for further stabilizing the mean wavelength of the light beam. The bandpass filter 104 may be a single Mach-Zehnder interferometer, multi-stage cascaded Mach-Zehnder interferometers, an arrayed waveguide grating, a transmission-type Bragg waveguide grating, an echelle grating, or another suitable structure.

The first and second output ports of the power splitter 106 are respectively coupled to the grating coupler 102D and the polarization filter 110. The input and output ports of the polarization filter 110 are respectively coupled to the second output port of the power splitter 106 and the input port of the power splitter 108. In the invention, the power splitters 106 and 108 may be 1×2 multimode interference (MMI) waveguide couplers for wideband operations, 1×2 Y-junction power splitter or other power splitters/couplers. In addition, the polarization filter 110 is configured to keep the light beam at the polarization state of transverse electric wave, and may provide a polarization extinction ratio greater than 20 dB. In another embodiment, the second output port of the power splitter 106 may be coupled to multi-stage cascaded polarization filters for further improving the polarization extinction ratio.

The first and second input ports of the phase modulator 112 are respectively coupled to the first and second output ports of the power splitter 108, and the first and second output ports of the phase modulator 112 are respectively coupled to the grating couplers 102B, 102C. In the phase modulator 112, the first and second input ports respectively correspond to the first and second output ports. In some embodiments, the phase modulator 112 is a silicon-doped PN junction phase modulator, in which a forward or backward bias voltage is applied to the PN junction for phase modulation. If the fiber coil coupled to the grating couplers 102B and 102C is relatively long, the phase modulator 112 may be substituted with an amorphous silicon microheater or a metal microheater of which the length is less than 50 microns, so as to reduce the residual light intensity modulation accompanied with phase modulation as well as the overall system size of the silicon photonic integrated circuit 100A coupled with the fiber coil.

Figure 1B:
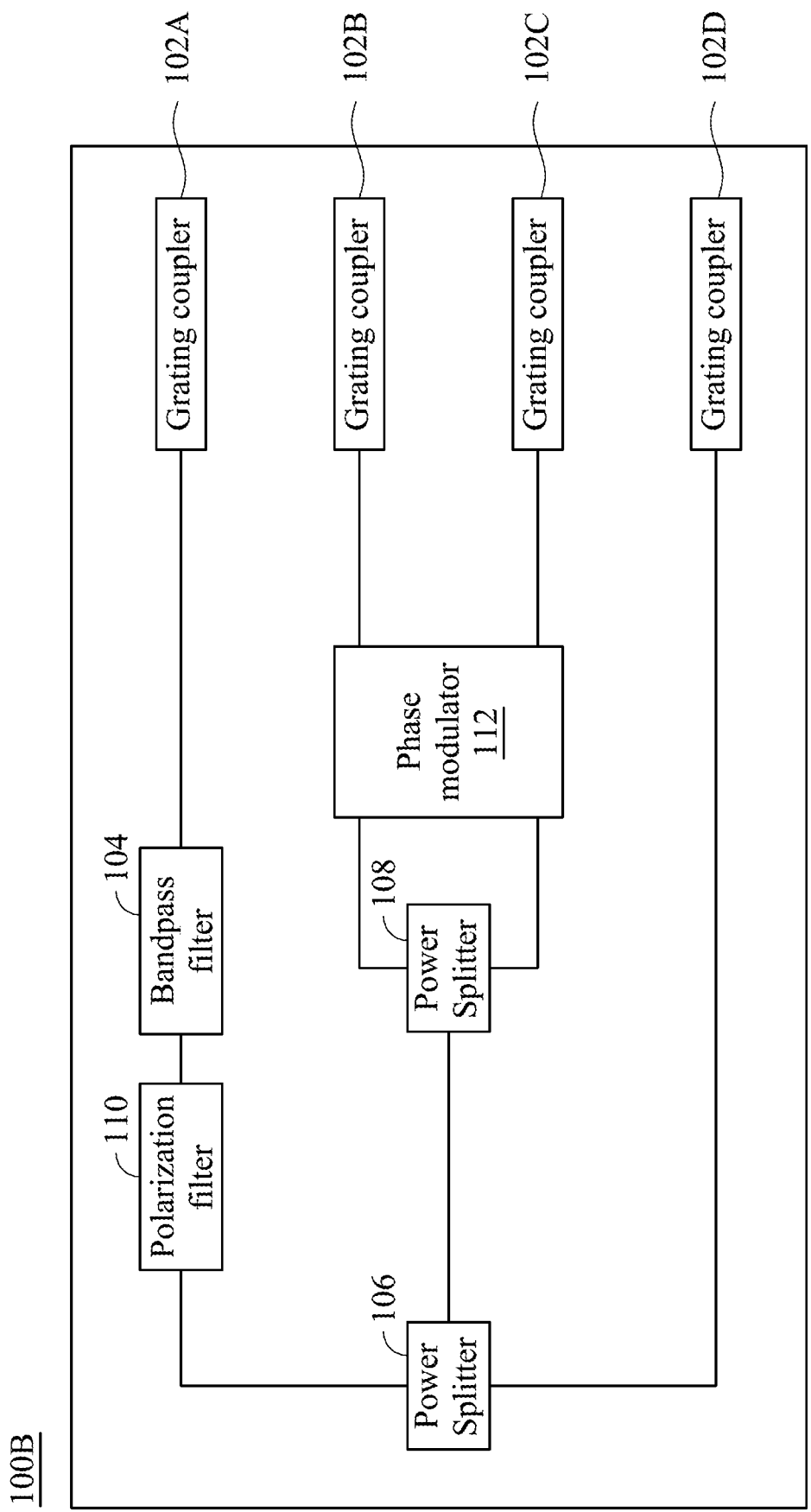

FIG. 1B is a schematic diagram of a silicon photonic integrated circuit 100B in accordance with some embodiments of the invention. In comparison with the silicon photonic integrated circuit 100A in FIG. 1A, in the silicon photonic integrated circuit 100B, as shown in FIG. 1B, the input and output ports of the polarization filter 110 are respectively coupled to the first output port of the bandpass filter 104 and the input port of the power splitter 106.

Figure 1C:
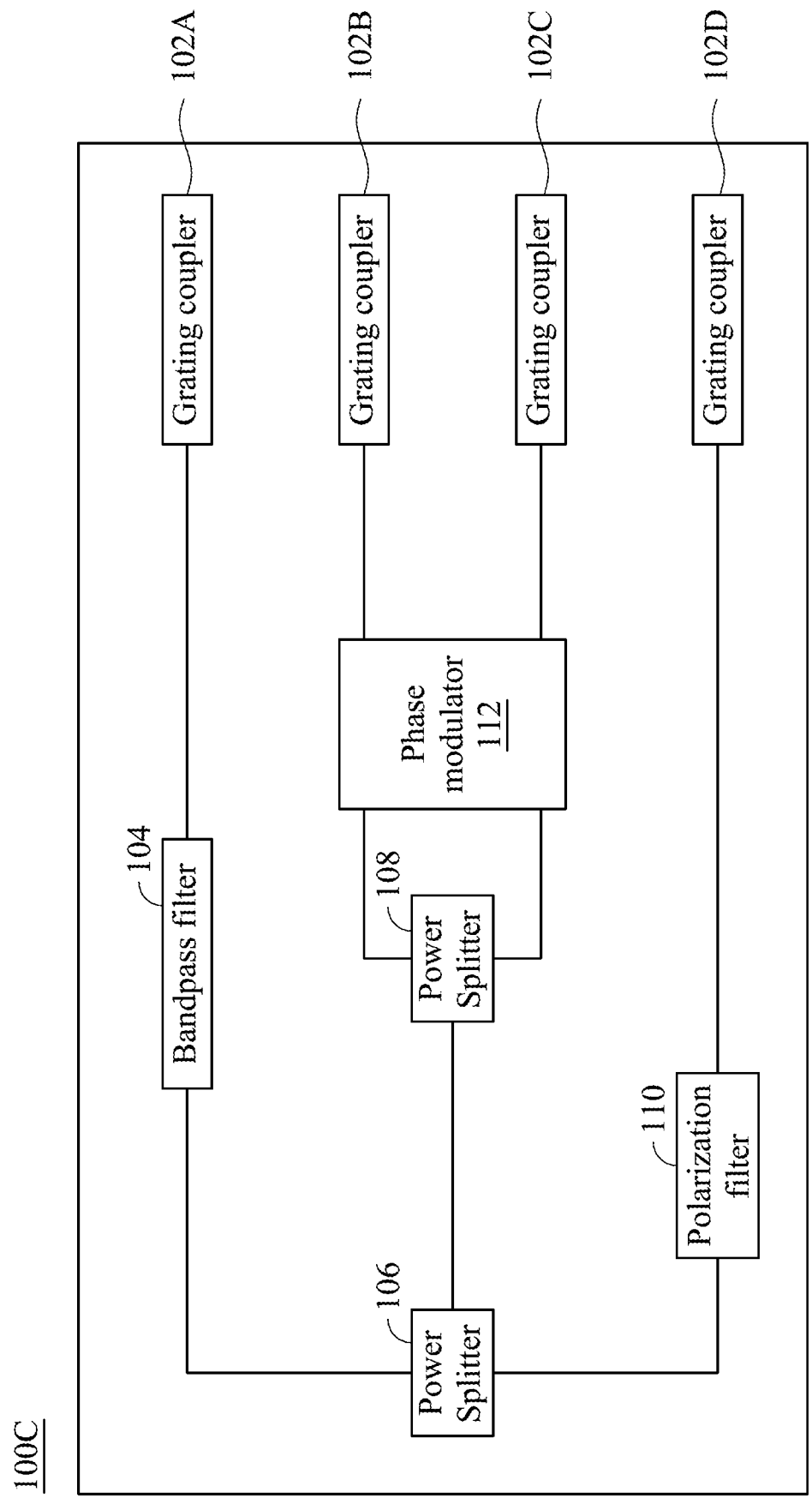

FIG. 1C is a schematic diagram of a silicon photonic integrated circuit 100C in accordance with some embodiments of the invention. In comparison with the silicon photonic integrated circuit 100A in FIG. 1A and the silicon photonic integrated circuit 100B in FIG. 1B, in the silicon photonic integrated circuit 100C, as shown in FIG. 1C, the input and output ports of the polarization filter 110 are respectively coupled to the first output port of the power splitter 106 and the grating coupler 102D.

Figure 2:
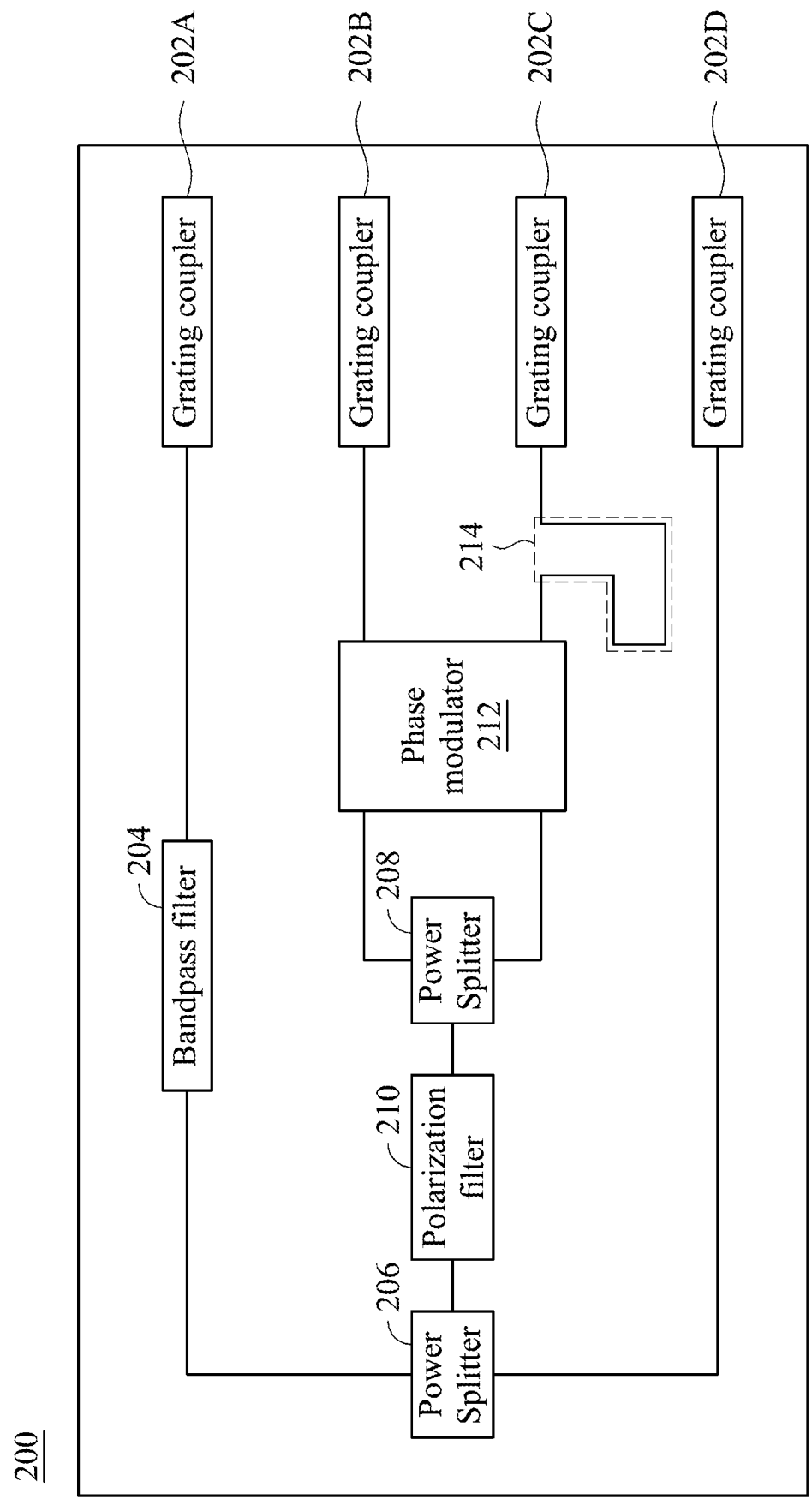
FIG. 2 is a schematic diagram of a silicon photonic integrated circuit in accordance with some embodiments of the invention.

FIG. 2 is a schematic diagram of a silicon photonic integrated circuit 200 in accordance with some embodiments of the invention. The silicon photonic integrated circuit 200 includes grating couplers 202A-202D, a bandpass filter 204, power splitters 206 and 208, a polarization filter 210, a phase modulator 212 and a delay line 214. The grating couplers 202A-202D, the bandpass filter 204, the power splitters 206 and 208, the polarization filter 210 and the phase modulator 212 respectively correspond to the grating couplers 102A-102D, the bandpass filter 104, the power splitters 106 and 108, the polarization filter 110 and the phase modulator 112 of the silicon photonic integrated circuit 100A, while the delay line 214 is configured to lengthen the path from the phase modulator 212 to the grating coupler 202C, such that the paths from the phase modulator 212 respectively to the grating couplers 202B and 202C are different, and the difference of the lengths thereof is greater than the coherent length of the input light, so as to reduce the optical interference due to interfacial reflections of the light from the grating couplers 202B and 202C.

Figure 3:
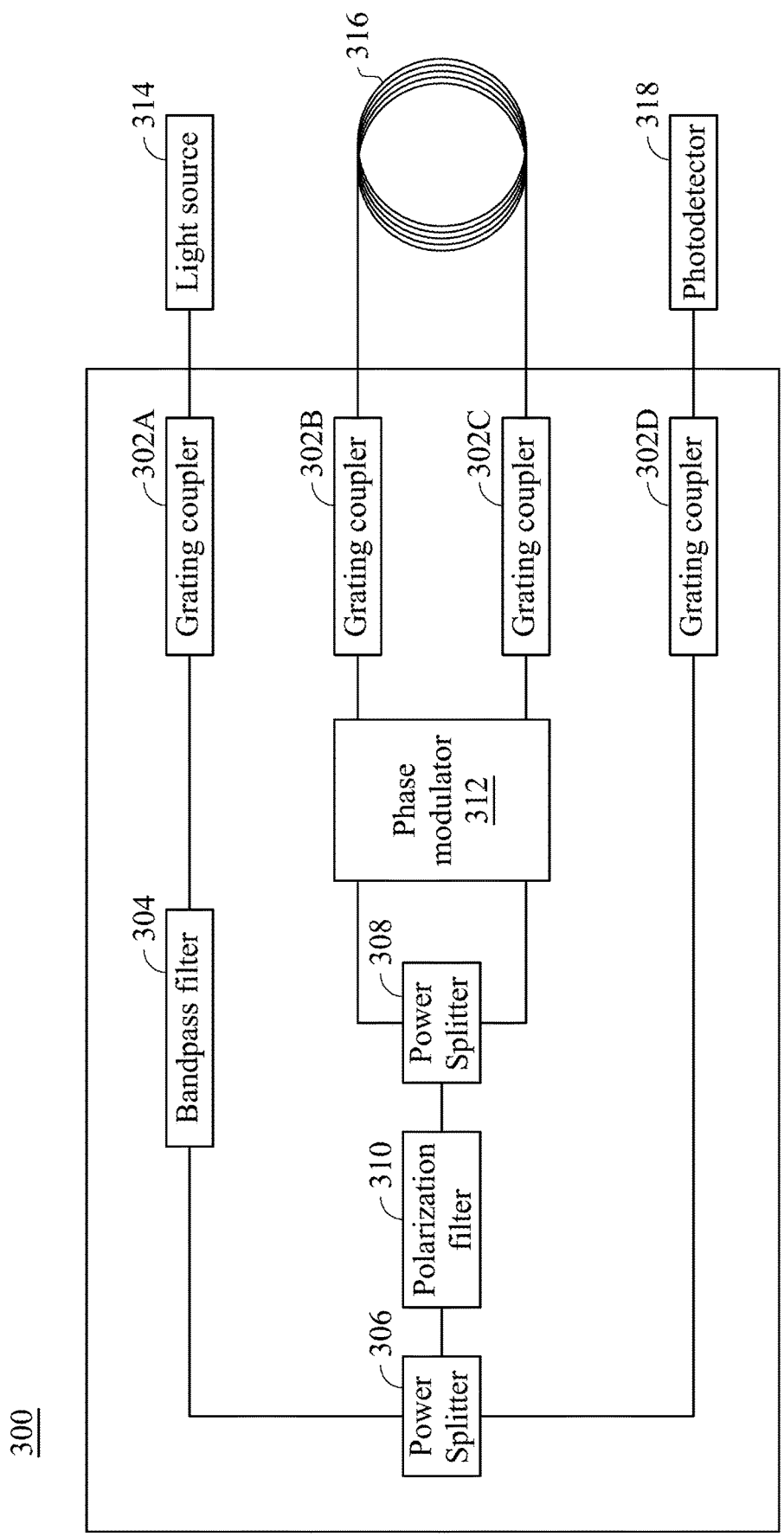
FIG. 3 is a schematic diagram of a fiber optic gyroscope (FOG) apparatus in accordance with some embodiments of the invention.

FIG. 3 is a schematic diagram of a fiber optic gyroscope (FOG) apparatus 300 in accordance with some embodiments of the invention. The FOG apparatus 300 includes grating couplers 302A-302D, a bandpass filter 304, power splitters 306 and 308, a polarization filter 310, a phase modulator 312, a light source 314, a fiber coil 316 and a photodetector 318, in which the grating couplers 302A-302D, the bandpass filter 304, the power splitters 306 and 308, the polarization filter 310, the phase modulator 312 are integrated into a silicon photonic integrated circuit, while the light source 314, the two opposite ends of the fiber coil 316 and the photodetector 318 optically couples the grating couplers 302A-302D, respectively. The grating couplers 302A-302D, the bandpass filter 304, the power splitters 306 and 308, the polarization filter 310 and the phase modulator 312 respectively correspond to the grating couplers 102A-102D, the bandpass filter 104, the power splitters 106 and 108, the polarization filter 110 and the phase modulator 112 of the silicon photonic integrated circuit 100A. The light source 314 is configured to provide an input light beam, which may be such as an SLD, an EDFA, or another suitable light source. The photodetector 318 is configured to receive the light beam that is coupled out from the first output port of the power splitter 306 and through the grating coupler 302D, which may be a PIN photodiode, an avalanche photodiode, or another suitable photodiode. The FOG apparatus 300 may be a single entity, i.e., the silicon photonic integrated circuit, the light source 314, the fiber coil 316 and the photodetector 318 of the FOG apparatus 300 may be integrate into a single entity.

Figure 4:
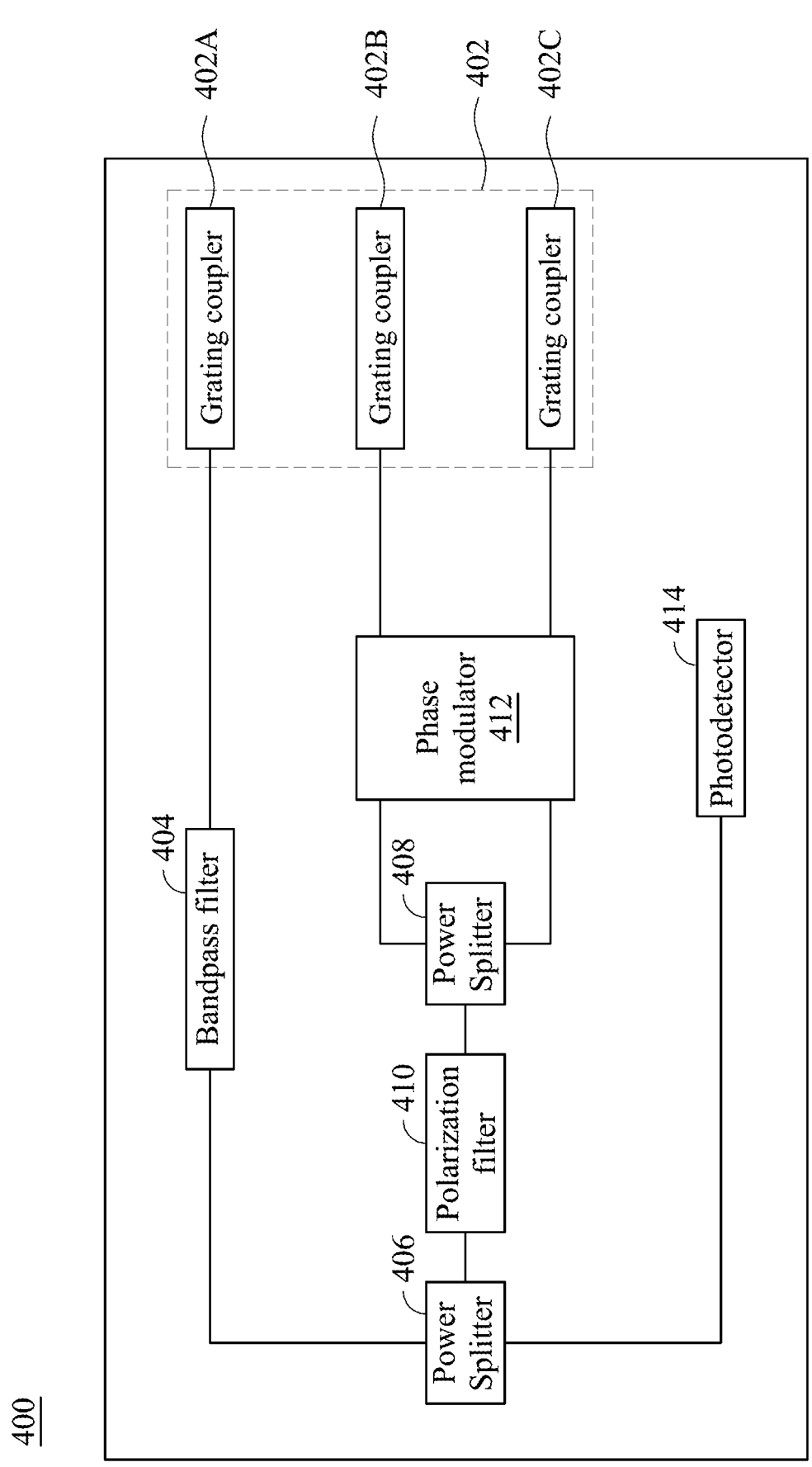
FIG. 4 is a schematic diagram of a silicon photonic integrated circuit in accordance with some embodiments of the invention.

FIG. 4 is a schematic diagram of a silicon photonic integrated circuit 400 in accordance with some embodiments of the invention. The silicon photonic integrated circuit 400 includes grating couplers 402A-402C, a bandpass filter 404, power splitters 406 and 408, a polarization filter 410, a phase modulator 412 and a photodetector 414. The grating couplers 402A-402C, the bandpass filter 404, the power splitters 406 and 408, the polarization filter 410 and the phase modulator 412 respectively correspond to the grating couplers 102A-102C, the bandpass filter 104, the power splitters 106 and 108, the polarization filter 110 and the phase modulator 112 of the silicon photonic integrated circuit 100A. In comparison with the silicon photonic integrated circuit 100A in FIG. 1A, in the silicon photonic integrated circuit 400, as shown in FIG. 4, the photodetector 414 is directly fabricated on the chip, and is coupled to the first output port of the power splitter 406 rather than a grating coupler. The photodetector 414 may be a germanium photodetector, a silicon-germanium photodetector, or another suitable photodetector, and may be fabricated on the chip by utilizing a suitable semiconductor process. In addition, the grating couplers 402A-402C may form a grating coupler array 402. In the grating coupler array 402, the grating couplers 402A-402C are aligned with respect to each other, and may be arranged at the same pitch in an arrangement direction thereof. According to various embodiments, the polarization filter 410 may be modified to couple the first output port of the bandpass filter 404 and the input port of the power splitter 406 respectively through the input and output ports thereof, or may be modified to couple the first output port of the power splitter 406 and the photodetector 414 respectively through the input and output ports thereof.

Figure 5B:
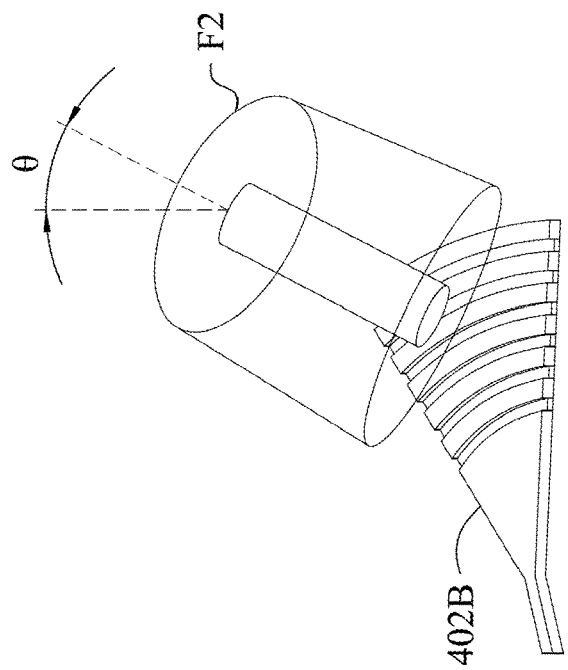
FIG. 5B illustrates a single fiber of a fiber array structure coupled to a single grating coupler of a silicon photonic integrated circuit.
Figure 5A:
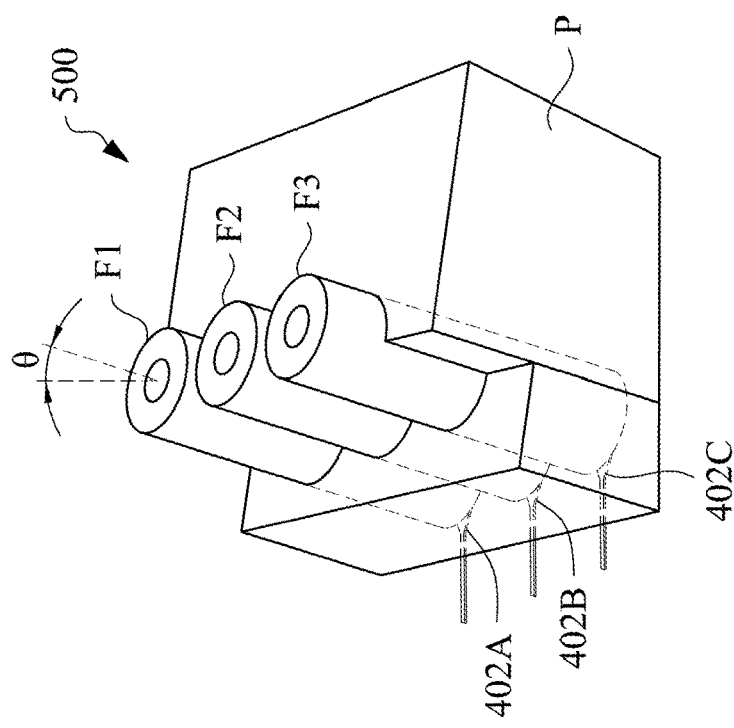
FIG. 5A illustrates a fiber array structure coupled to the grating array of the silicon photonic integrated circuit in FIG. 4.

FIG. 5A illustrates a fiber array structure 500 coupled to the grating coupler array 402 of the silicon photonic integrated circuit 400. As shown in FIG. 5A, the fiber array structure 500 has a connector P and a fiber array with fibers F1-F3. In the fiber array, the fibers F1-F3 are aligned with respect to each other, and may be arranged at the same pitch in an arrangement direction thereof. One ends of the fibers F1-F3 are inserted in the connector P; the other end of the fiber F1 is coupled to a light source, and the other ends of the fibers F2 and F3 are respectively coupled to two opposite ends of a fiber coil (or alternatively the other ends of the fibers F2 and F3 are two opposite ends of a fiber coil). As such, when the connector P is connected with the silicon photonic integrated circuit 400, the fiber array is aligned with the grating array 402, in which the ends of the fibers F1-F3 inserted in the connector P are respectively over the grating couplers 402A-402C, and the extending direction thereof is at an angle θ relative to the normal direction of the silicon photonic integrated circuit 400. For example, as shown in FIG. 5B, one end of the fiber F2 is directly over the grating structure area of the grating coupler 402B, and the extending direction thereof is at an angle θ relative to the normal direction of the silicon photonic integrated circuit 400. The angle θ may be in a range from 8° to 11°, in order to reduce the light reflection from the grating coupler 402B and simultaneously have better coupling performance. It is noted that the grating structure area of the grating coupler according to the invention may have another shape (such as rectangular), and is not limited to the fan shape illustrated in FIG. 5B. In addition, the arrangement pitch of the grating couplers in the grating coupler array 402 and the arrangement pitch of the fibers in the fiber array may be, but is not limited to, 250 microns or 127 microns in compliance with the standard.

Figure 6:
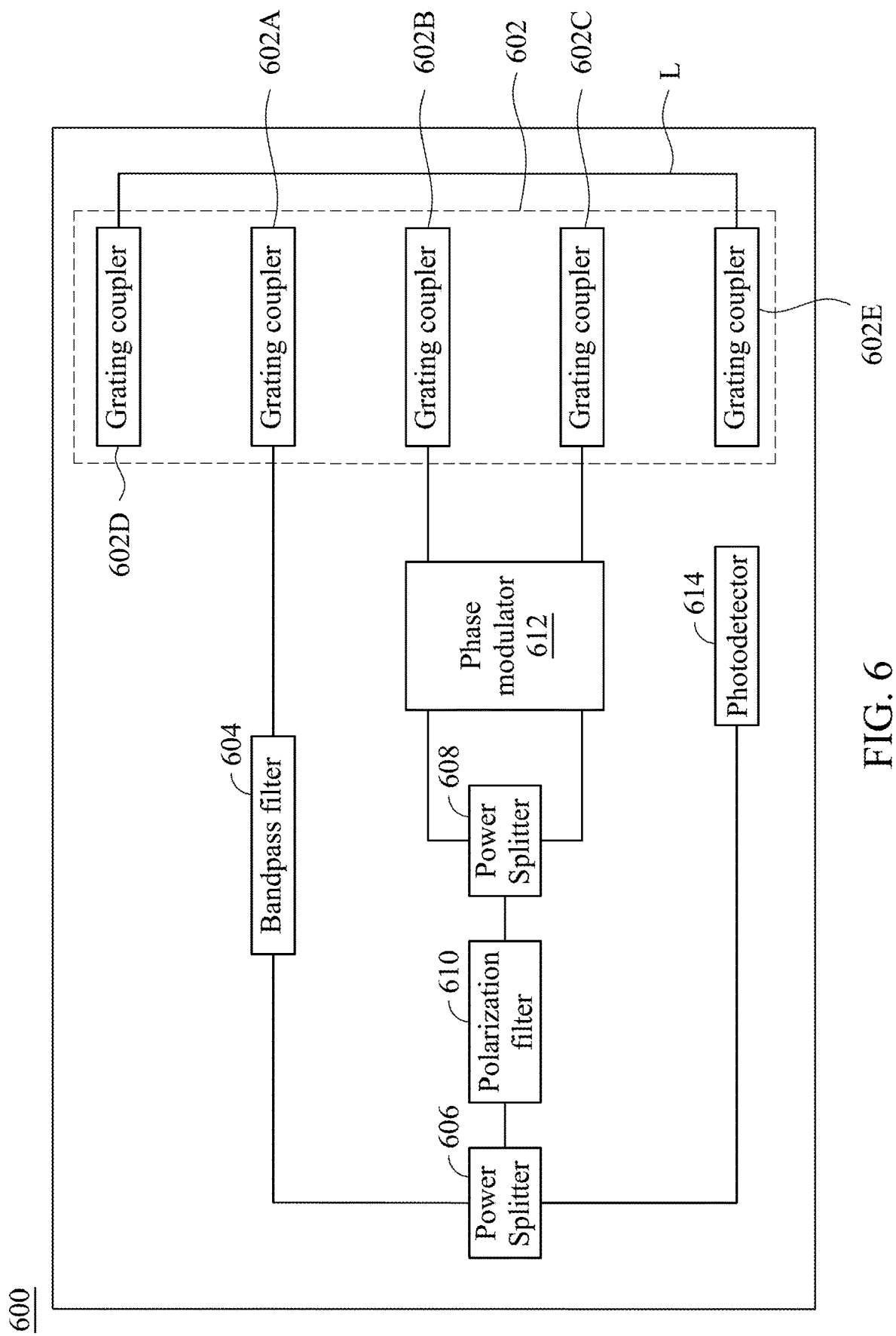
FIG. 6 is a schematic diagram of a silicon photonic integrated circuit in accordance with some embodiments of the invention.

FIG. 6 is a schematic diagram of a silicon photonic integrated circuit 600 in accordance with some embodiments of the invention. The silicon photonic integrated circuit 600 includes grating couplers 602A-602E, a bandpass filter 604, power splitters 606 and 608, a polarization filter 610, a phase modulator 612 and a photodetector 614. The grating couplers 602A-602C, the bandpass filter 604, the power splitters 606 and 608, the polarization filter 610, the phase modulator 612 and the photodetector 614 respectively correspond to the grating couplers 402A-402C, the bandpass filter 404, the power splitters 406 and 408, the polarization filter 410, the phase modulator 412 and the photodetector 414 of the silicon photonic integrated circuit 400. In comparison with the silicon photonic integrated circuit 400 in FIG. 4, the silicon photonic integrated circuit 600 further includes the grating couplers 602D and 602E. As shown in FIG. 6, the grating couplers 602A-602E form a grating coupler array 602, which are arranged at the same pitch in an arrangement direction thereof and are aligned with respect to each other. In the grating coupler array 602, the grating couplers 602D and 602E are respectively the first and last grating couplers and are coupled to each other through the connecting wire L. As such, when a corresponding fiber array structure (similar to the fiber array structure shown in FIG. 5A, but the fiber array thereof has five optical fibers aligned with each other in an arrangement direction) is connected with the silicon photonic integrated circuit 600, the alignment accuracy between the other fibers and the grating couplers 602A-602C can be determined based on the statuses of providing and receiving a testing light beam respectively by the first fiber and the last fiber of the fiber array structure. In other embodiments of the invention, structures similar to the grating couplers 602D and 602E and the connecting wire L may also be arranged at the upper and lower sides of the grating coupler array (e.g. the grating coupler array 402 in FIG. 4).

Figure 7:
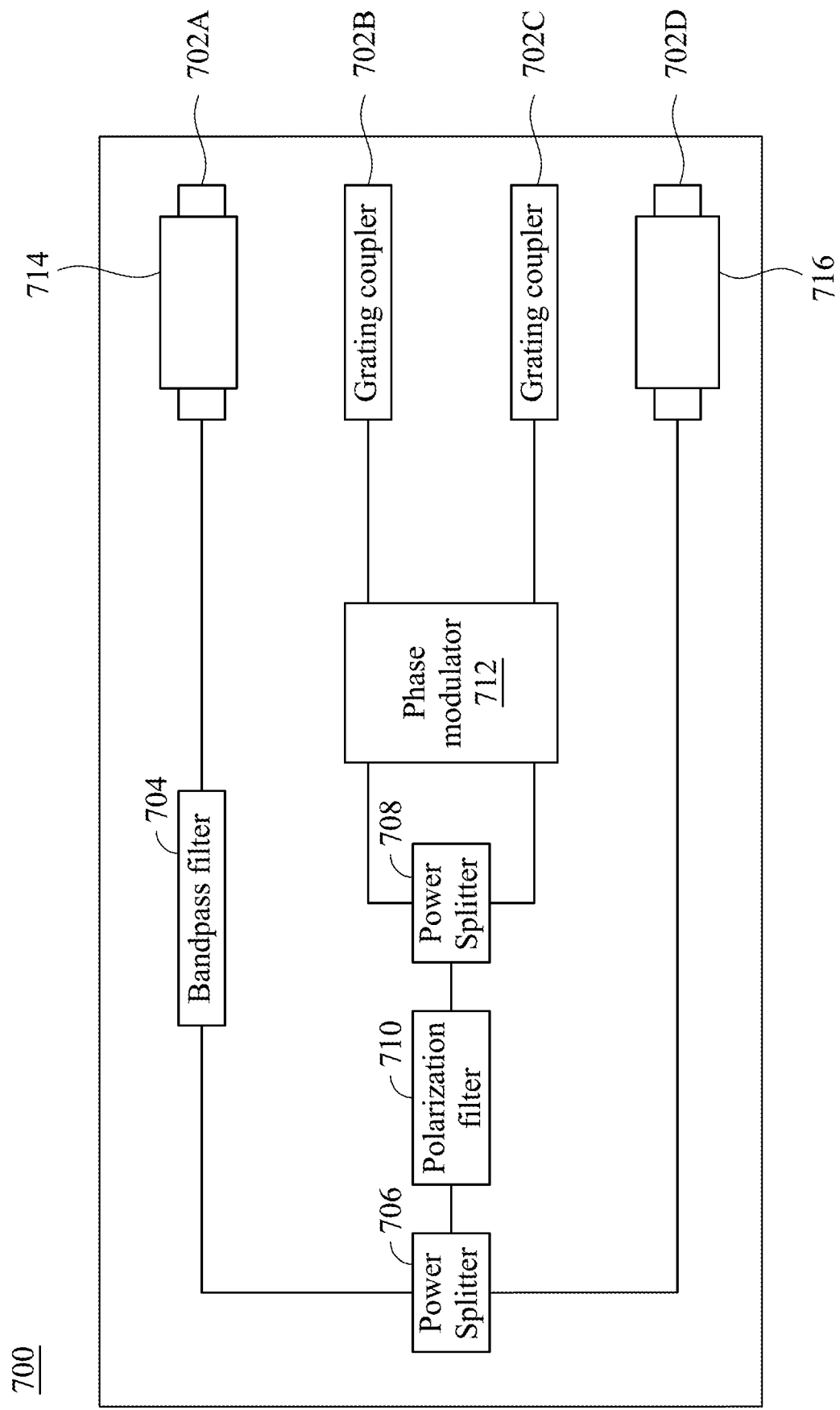
FIG. 7 is a schematic diagram of a silicon photonic integrated circuit in accordance with some embodiments of the invention.

FIG. 7 is a schematic diagram of a silicon photonic integrated circuit 700 in accordance with some embodiments of the invention. The silicon photonic integrated circuit 700 includes grating couplers 702A-702D, a bandpass filter 704, power splitters 706 and 708, a polarization filter 710, a phase modulator 712, a light source 714 and a photodetector 716. The grating couplers 702A-702D, the bandpass filter 704, the power splitters 706 and 708, the polarization filter 710 and the phase modulator 712 respectively correspond to the grating couplers 102A-102D, the bandpass filter 104, the power splitters 106 and 108, the polarization filter 110 and the phase modulator 112 of the silicon photonic integrated circuit 100A, while the light source 714 and the photodetector 716 are respectively bonded directly over the grating couplers 702A and 702D by packaging for free-space optical coupling. The light source 714 may be a SLD, a vertical-cavity surface-emitting laser (VCSEL), or another light source suitable to be bonded directly over the grating coupler 702A. In addition, the photodetector 716 may be a back-side illuminated photodetector that is bonded front side up and directly over the grating coupler 702D, or may be a front-side illuminated photodetector that is bonded directly over the grating coupler 702D by flip-chip bonding technology.

Figure 8A:
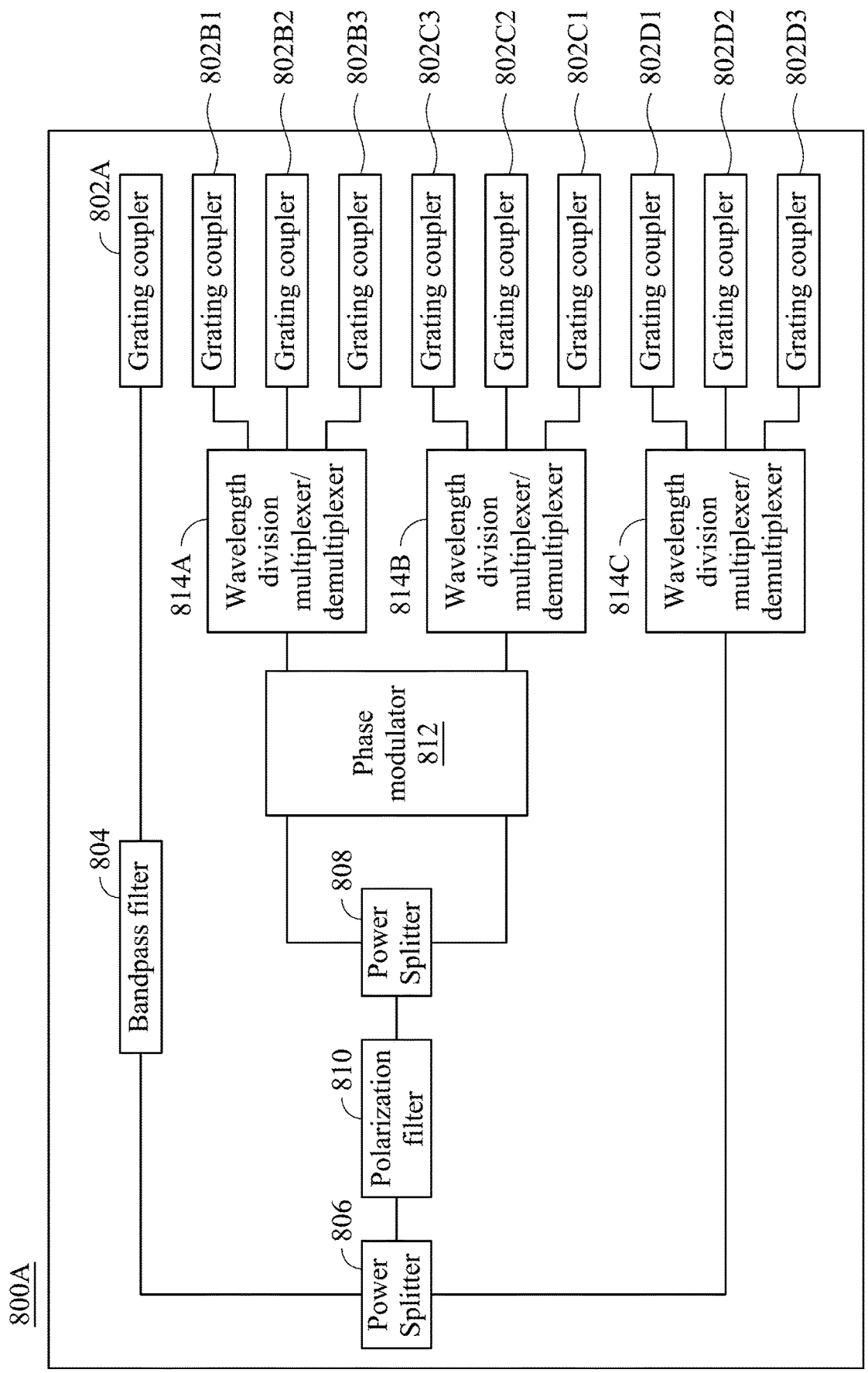
FIGS. 8A and 8B are respective schematic diagrams of silicon photonic integrated circuits in accordance with various embodiments of the invention.

FIG. 8A is a schematic diagram of a silicon photonic integrated circuit 800A in accordance with some embodiments of the invention. The silicon photonic integrated circuit 800A includes grating couplers 802A, 802B1-802B3, 802C1-802C3 and 802D1-802D3, a bandpass filter 804, power splitters 806 and 808, a polarization filter 810, a phase modulator 812 and wavelength division multiplexers/demultiplexers 814A-814C. The grating coupler 802A, the bandpass filter 804, the power splitters 806 and 808, the polarization filter 810 and the phase modulator 812 respectively correspond to the grating coupler 102A, the bandpass filter 104, the power splitters 106 and 108, the polarization filter 110 and the phase modulator 112 of the silicon photonic integrated circuit 100A. In the silicon photonic integrated circuit 800A, the first and second output ports of the phase modulator 812 and the first output port of the power splitter 806 respectively correspond to the input ports of the wavelength division multiplexers/demultiplexers 814A-814C, the first to third output ports of the wavelength division multiplexer/demultiplexer 814A are respectively coupled to the grating couplers 802B1-802B3, the first to third output ports of the wavelength division multiplexer/demultiplexer 814B are respectively coupled to the grating couplers 802C1-802C3, and the first to third output ports of the wavelength division multiplexer/demultiplexer 814C are respectively coupled to the grating couplers 802D1-802D3. The grating couplers 802B1 and 802C1 are configured to respectively couple two opposite ends of a first fiber coil, the grating couplers 802B2 and 802C2 are configured to respectively couple two opposite ends of a second fiber coil, the grating couplers 802B3 and 802C3 are configured to respectively couple two opposite ends of a third fiber coil, and the grating couplers 802D1-802D3 are configured to optically couple three photodetectors, respectively. Each of the wavelength division multiplexers/demultiplexers 814A-814C may separate an incident light beam with a broad wavelength band into three light beams with different wavelength bands, in which the first output ports of the wavelength division multiplexers/demultiplexers 814A-814C correspond to the light beam with the same wavelength band, the second output ports of the wavelength division multiplexers/demultiplexers 814A-814C correspond to the light beam with the same wavelength band, and the third output ports of the wavelength division multiplexers/demultiplexers 814A-814C correspond to the light beam with the same wavelength band, respectively.

The silicon photonic integrated circuit 800A may connect three different fiber coils for sensing angular rotation rate in three axes by coupling the grating couplers 802A, 802B1-802B3, 802C1-802C3, 802D1-802D3 respectively to the corresponding elements. In addition, the wavelength division multiplexer/demultiplexer 814A (or 814B) divides the optical spectrum of an incident light beam equally into three light beams with different wavelength bands and outputted at different output ports. These three light beams respectively enter the corresponding fiber coils and travel back to the silicon photonic integrated circuit 800A through the fiber coils. Then the three light beams enter the corresponding output ports of wavelength division multiplexer/demultiplexer 814B (or 814A) to combine three light beams and to output at the input port of wavelength division multiplexer/demultiplexer 814B (or 814A). The combined light beam travels through the first output port of the power splitter 806 and enter the wavelength division multiplexer/demultiplexer 814C to again divide into three light beams with different wavelength bands and to output these divided light beams respectively to three different photodetectors. It is noted that the wavelength division multiplexer/demultiplexers 814A-814C actually have the same device design, such that the wavelength bands defined by the wavelength division multiplexer/demultiplexers 814A-814C are identical. For example, if a SLD with a wavelength bandwidth of 60 nm is adopted as the light source, then each of the wavelength division multiplexers/demultiplexers 814A-814C divides the incident light beam into three light beam components of which the wavelength bandwidths are all 20 nm and the wavelength bands are different with respect to each other, and then the grating couplers 802D1-802D3 respectively couple out these light beam components. The silicon photonic integrated circuit 800A can sense the angular rotation rate in three axes by using only a single phase modulator instead of arranging multiple phase modulators respectively corresponding to the light beam components. As a result, the overall FOG system size, the production cost, and the power consumption can be significantly reduced. In practice, each of the wavelength division multiplexers/demultiplexers 814A-814C may be multi-stage cascaded Mach-Zehnder interferometers for wavelength division multiplexing and de-multiplexing.

In addition, in the silicon photonic integrated circuit 800A, the ordered sequence of the grating couplers 802B1-802B3, 802C1-802C3 may be 802B1-802B2-802B3-802C3-802C2-802C1 for optically coupling three different fiber coils in ease. However, in the invention, the ordered sequence of the grating couplers 802B1-802B3, 802C1-802C3 may be determined depending on the arranging requirement of various elements in the system, and is not limited to the content illustrated in FIG. 8A.

Figure 8B:
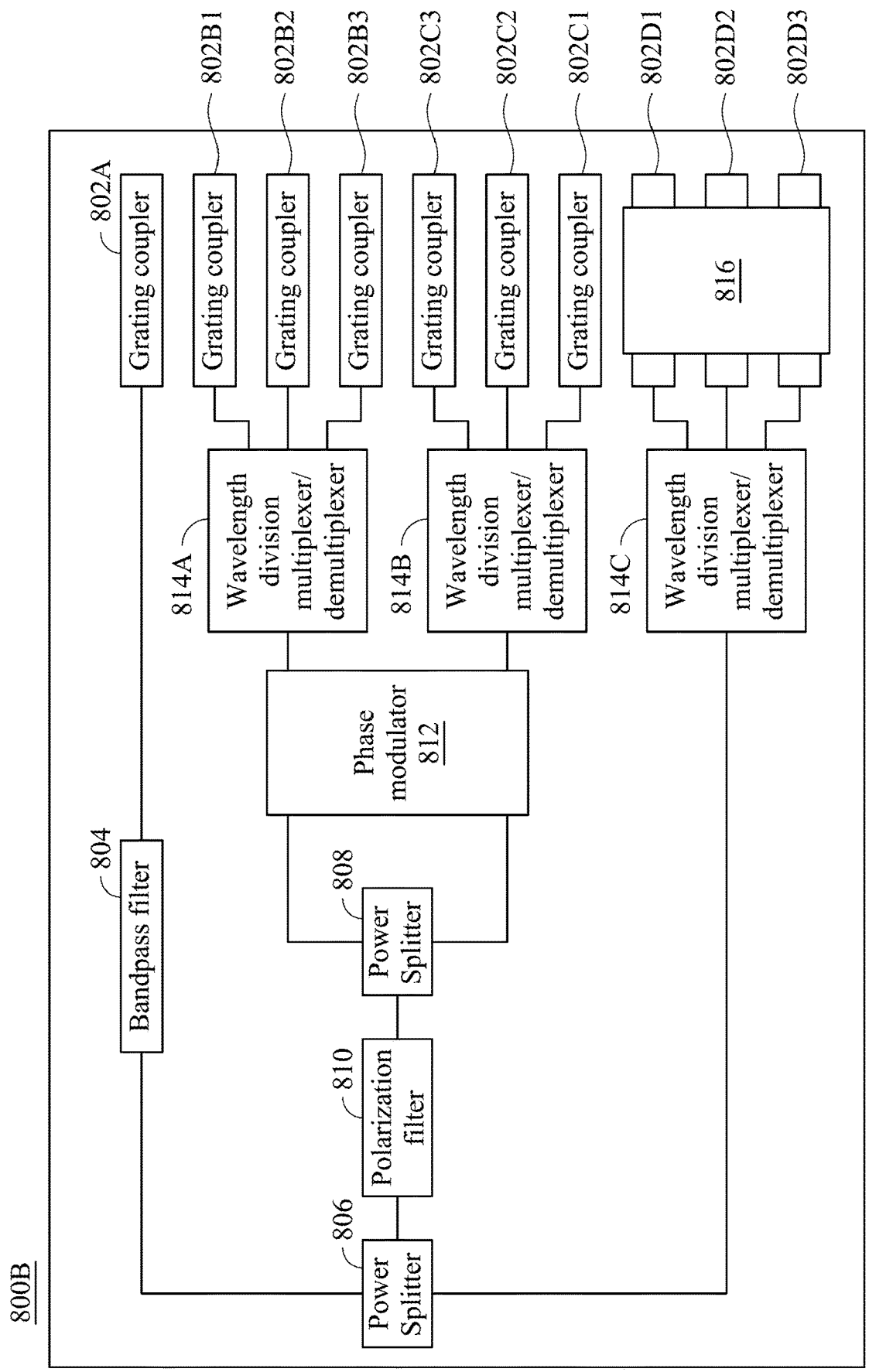

FIG. 8B is a schematic diagram of a silicon photonic integrated circuit 800B in accordance with some embodiments of the invention. In comparison with the silicon photonic integrated circuit 800A in FIG. 8A, the silicon photonic integrated circuit 800B further includes a photodetector array structure 816 that is bonded directly over the grating couplers 802D1-802D3 by packaging for free-space optical coupling. The photodetector array structure 816 includes three photodetectors in which three photodetectors are aligned with respect to each other and are arranged at the same pitch in an arrangement direction, and these photodetectors are respectively located directly over the grating couplers 802D1-802D3 after the photodetector array structure 816 is packaged. In some embodiments, the photodetector array structure 816 may be substituted with three physically separated photodetectors (e.g. the photodetector 716 shown in FIG. 7) that are respectively bonded directly over the grating couplers 802D1-802D3 by packaging. In addition, in another embodiment, the silicon photonic integrated circuit 800B may not include the grating couplers 802D1-802D3, and the photodetector array structure 816 may be substituted with three physically separated photodetectors (e.g. the photodetector 414 shown in FIG. 4) that are directly fabricated on the chip and are respectively coupled to the first to third output ports of the wavelength division multiplexer/demultiplexer 814C.

According to the embodiments of the invention, light is guided into or out of the chip through the grating coupler and thus, in comparison to the conventional method of guiding light into or out of the chip by edge coupling, the invention provides higher fiber alignment tolerance and better polarization extinction ratio. In the embodiments of the invention, each grating coupler may provide a polarization extinction ratio greater than 20 dB, and in the system arrangement, two of the grating couplers are configured to optically couple to two ends of a fiber coil, respectively, such that the polarization extinction ratio achieves greater than 40 dB; a polarization filter with a polarization extinction ratio of greater than 20 dB may further be inserted into the system to ensure that the light is kept at the polarization state of transverse electric wave, and that the polarization extinction ratio of the overall system achieves greater than 60 dB. In addition, the grating couplers may be sequentially arranged in one or more columns to form a grating coupler array, and a corresponding multi-channel fiber array may be used to perform one-time coupling with such grating coupler array for further reducing the complexity of system assembly. In particular, for the embodiments of the silicon photonic integrated circuit with a wavelength division multiplexer/demultiplexer, only a single silicon photonic integrated circuit with a single phase modulator is used to connect three fiber coils for sensing angular rotation rate in three axes, so as to further reduce the occupied area of the overall system as well as the production cost and the power consumption.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A silicon photonic integrated circuit comprising:
 a first power splitter having an input port, a first output port and a second output port, wherein the input port of the first power splitter is configured to receive an input light beam, and wherein the first output port of the first power splitter is configured to output a return light beam;
 a second power splitter having an input port, a first output port and a second output port, the input port of the second power splitter coupled to the second output port of the first power splitter;
 a first grating coupler coupled to a first output port of the second power splitter; and
 a second grating coupler coupled to a second output port of the second power splitter;
 wherein the first and second grating couplers are configured to optically couple two opposite ends of the same fiber coil, respectively.

2. The silicon photonic integrated circuit of claim 1 further comprising:
 a phase modulator having a first input port, a second input port, a first output port and a second output port, wherein the first and second input ports of the phase modulator are respectively coupled to the first and second output ports of the second power splitter, and wherein the first and second output ports of the phase modulator are respectively coupled to the first and second grating couplers.

3. The silicon photonic integrated circuit of claim 1 further comprising:
 a third grating coupler coupled to the input port of the first power splitter and configured to optically couple a light source that provides the input light beam.

4. The silicon photonic integrated circuit of claim 3, wherein the first to third grating couplers are arranged at the same pitch and are aligned with respect to each other in an arrangement direction.

5. The silicon photonic integrated circuit of claim 3 further comprising:
 fourth and fifth grating couplers; and
 a connecting wire of which two ends respectively coupled to the fourth and fifth grating couplers.

6. The silicon photonic integrated circuit of claim 5, wherein the first to fifth grating couplers are arranged at the same pitch and are aligned with respect to each other in an arrangement direction, and wherein the first to third grating couplers are arranged between the fourth and fifth grating couplers.

7. The silicon photonic integrated circuit of claim 1 further comprising:
 a bandpass filter coupled to the input port of the first power splitter.

8. The silicon photonic integrated circuit of claim 1 further comprising:
 a fourth grating coupler coupled to the first output port of the first power splitter and configured to optically couple a photodetector.

9. The silicon photonic integrated circuit of claim 1 further comprising:
a polarization filter coupled to the second output port of the first power splitter and the input port of the second power splitter, or coupled to the input port of the first power splitter, or coupled to the first output port of the first power splitter.

10. The silicon photonic integrated circuit of claim 1 further comprising:
a photodetector coupled to the first output port of the first power splitter and configured to receive the return light beam.

11. A silicon photonic integrated circuit comprising:
a first power splitter having an input port, a first output port and a second output port, wherein the input port of the first power splitter is configured to receive an input light beam, and wherein the first output port of the first power splitter is configured to output a return light beam;
a second power splitter having an input port, a first output port and a second output port, wherein the input port of the second power splitter is coupled to the second output port of the first power splitter;
a first wavelength division multiplexer/demultiplexer having an input port and first to third output ports, wherein the input port of the first wavelength division multiplexer/demultiplexer is coupled to the first output port of the second power splitter;
a second wavelength division multiplexer/demultiplexer having an input port and first to third output ports, wherein the input port of the second wavelength division multiplexer/demultiplexer is coupled to the second output port of the second power splitter; and
first to sixth grating couplers respectively coupled to the first to third output ports of the first wavelength division multiplexer/demultiplexer and the first to third output ports of the second wavelength division multiplexer/demultiplexer;
wherein the first and fourth grating couplers are configured to optically couple two opposite ends of a first fiber coil, respectively, wherein the second and fifth grating couplers are configured to optically couple two opposite ends of a second fiber coil, respectively, and wherein the third and sixth grating couplers are configured to optically couple two opposite ends of a third fiber coil, respectively.

12. The silicon photonic integrated circuit of claim 11, further comprising:
a phase modulator having a first input port, a second input port, a first output port and a second output port, wherein the first and second input ports of the phase modulator are respectively coupled to the first and second output ports of the second power splitter, and wherein the first and second output ports of the phase modulator are respectively coupled to the input port of the first wavelength division multiplexer/demultiplexer and the input port of the second wavelength division multiplexer/demultiplexer.

13. The silicon photonic integrated circuit of claim 11 further comprising:
a seventh grating coupler coupled to the input port of the first power splitter and configured to optically couple a light source that provides the input light beam.

14. The silicon photonic integrated circuit of claim 11, wherein the first to seventh grating couplers are arranged at the same pitch in an arrangement direction and are aligned with respect to each other.

15. A fiber optic gyroscope (FOG) apparatus comprising:
a light source;
a first power splitter having an input port, a first output port and a second output port, wherein the input port of the first power splitter is coupled to the light source;
a first photodetector coupled to the first output port of the first power splitter;
a second power splitter having an input port, a first output port and a second output port, wherein the input port of the second power splitter is coupled to the second output port of the first power splitter;
a first grating coupler coupled to the first output port of the second power splitter;
a second grating coupler coupled to the second output port of the second power splitter; and
a first fiber coil having two opposite ends that are optically coupled to the first and second grating couplers, respectively.

16. The FOG apparatus of claim 15 further comprising:
a third grating coupler coupled to the input port of the first power splitter and configured to couple the input light beam provided by the light source to the input port of the first power splitter.

17. The FOG apparatus of claim 16, wherein the first to third grating couplers are at the same pitch and are aligned with respect to each other in an arrangement direction.

18. The FOG apparatus of claim 15 further comprising:
a first wavelength division multiplexer/demultiplexer having an input port and first to third output ports, wherein the input port and the first output port of the first wavelength division multiplexer/demultiplexer are respectively coupled to the first output port of the second power splitter and the first grating coupler;
a second wavelength division multiplexer/demultiplexer having an input port and first to third output ports, wherein the input port and the first output port of the second wavelength division multiplexer/demultiplexer are respectively coupled to the second output port of the second power splitter and the second grating coupler;
third to sixth grating couplers respectively coupled to the second output port of the first wavelength division multiplexer/demultiplexer, the second output port of the second wavelength division multiplexer/demultiplexer, the third output port of the first wavelength division multiplexer/demultiplexer and the third output port of the second wavelength division multiplexer/demultiplexer;
a second fiber coil having two opposite ends that are optically coupled to the third and fourth grating couplers, respectively; and
a third fiber coil having two opposite ends that are optically coupled to the fifth and sixth grating couplers, respectively.

19. The FOG apparatus of claim 18 further comprising:
a phase modulator, wherein first and second input ports of the phase modulator are respectively coupled to the first and second output ports of the second power splitter, and wherein first and second output ports of the phase modulator are respectively coupled to the input port of the first wavelength division multiplexer/demultiplexer and the input port of the second wavelength division multiplexer/demultiplexer.

20. The FOG apparatus of claim 18 further comprising:
a third wavelength division multiplexer/demultiplexer having an input port and first to third output ports, wherein the input port of the third wavelength division multiplexer/demultiplexer is coupled to the first output port of the first power splitter; and a photodetector array structure having a second photodetector and a third photodetector in addition to the first photodetector, wherein the first to third photodetectors are optically coupled to the first to third output ports of the third wavelength division multiplexer/demultiplexer, respectively.

\* \* \* \* \*